United States Patent [19]
Plocher

[11] Patent Number: 6,011,487
[45] Date of Patent: *Jan. 4, 2000

[54] SYSTEM AND METHOD OF LOCATING WIRELESS DEVICES

[75] Inventor: Peter H. Plocher, Duluth, Ga.

[73] Assignee: NCR Corporation, Dayton, Ohio

[ * ] Notice: This patent is subject to a terminal disclaimer.

[21] Appl. No.: 08/718,623

[22] Filed: Sep. 17, 1996

[51] Int. Cl.$^7$ .................................................. G08B 5/22
[52] U.S. Cl. .................... 340/825.49; 342/450; 342/451; 235/383; 235/385
[58] Field of Search ................. 340/825.69, 825.72, 340/825.49, 825.36, 825.54, 825.35, 573, 533; 364/516, 900, 400, 401; 395/210, 183.19, 214; 342/450, 451, 463; 235/383, 385

[56] References Cited

U.S. PATENT DOCUMENTS

| | | | |
|---|---|---|---|
| 3,886,553 | 5/1975 | Bates | 343/112 R |
| 4,002,886 | 1/1977 | Sundelin | 235/61.7 R |
| 4,317,229 | 2/1982 | Craig et al. | 455/277 |
| 4,500,880 | 2/1985 | Gomersall et al. | 340/825.35 |
| 4,603,325 | 7/1986 | Marino et al. | 340/539 |
| 4,929,819 | 5/1990 | Collins, Jr. | 235/383 |
| 4,994,809 | 2/1991 | Yung et al. | 342/108 |
| 5,003,317 | 3/1991 | Gray et al. | 342/457 |
| 5,027,314 | 6/1991 | Linwood et al. | 364/900 |
| 5,051,741 | 9/1991 | Wesby | 340/825.49 |
| 5,097,484 | 3/1992 | Akaiwa | 375/40 |
| 5,172,314 | 12/1992 | Poland et al. | 364/401 |
| 5,173,710 | 12/1992 | Kelley et al. | 342/463 |
| 5,245,534 | 9/1993 | Waterhouse et al. | 364/404 |
| 5,287,266 | 2/1994 | Malec et al. | 364/401 |
| 5,396,224 | 3/1995 | Dukes et al. | 340/825.49 |
| 5,758,064 | 5/1998 | Zimmerman et al. | 395/183.19 |

*Primary Examiner*—Michael Horabik
*Assistant Examiner*—Jean B. Jeanglaude
*Attorney, Agent, or Firm*—Paul W. Martin; Peter H. Priest

[57] ABSTRACT

A system and method of locating a wireless device which relies on signal strength measurements and the known positions of receiving sensors. The system includes a number of transceivers each including a transmitter which transmits a first signal to the wireless device, a plurality of receivers including a plurality of sensors and at least one signal strength determining circuit for determining signal strengths of second signals received by the sensors, and a control circuit for controlling transmission of the first signal and reception of the second signals. A storage medium contains the locations for each of the sensors. A computer coupled to the control circuit instructs the control circuit to transmit the first signal and determines a location of the wireless device from the signal strengths and from the locations of the sensors.

20 Claims, 3 Drawing Sheets

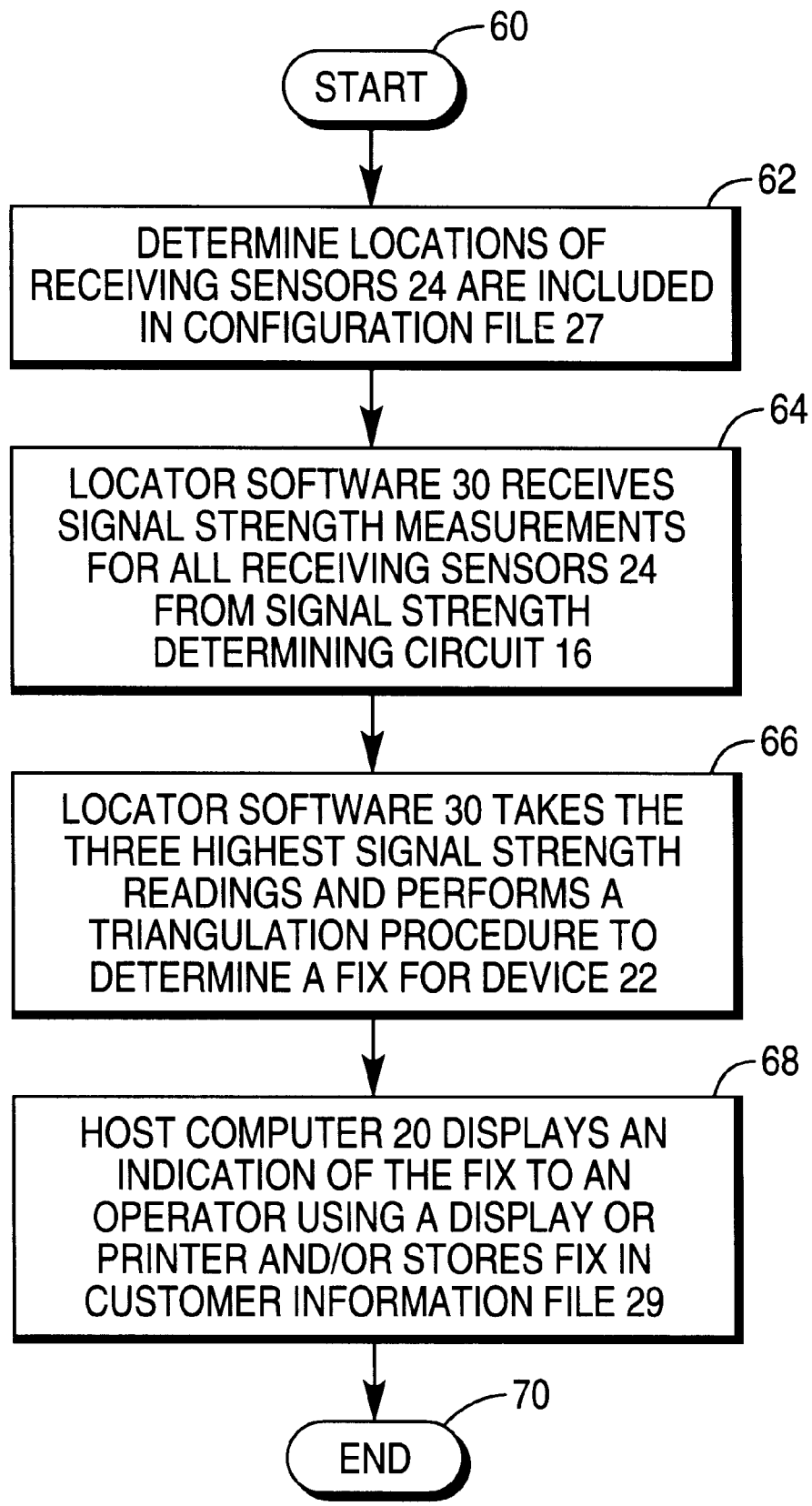

SYSTEM AND METHOD OF LOCATING WIRELESS DEVICES

CROSS-REFERENCE TO RELATED APPLICATION

The present invention is related to the following commonly assigned and co-pending U.S. applications:

"Method Of Locating Electronic Price Labels In Transaction Establishments", filed Oct. 5, 1995, invented by Goodwin, and having a Ser. No. 08/539,450;

"Device and Method Of Locating Electronic Price Labels In Transaction Establishments", filed Jan. 30, 1996, invented by Goodwin et al., and having a Ser. No. 08/593,983;

"Method Of Locating Electronic Price Labels In Transaction Establishments", filed Feb. 16, 1996, invented by Goodwin et al., and having a Ser. No. 08/603,007; and "System and Method of Tracking Short Range Transmitters", filed Sep. 17, 1996, invented by Goodwin, and having a Ser. No. 08/718,622.

BACKGROUND OF THE INVENTION

The present invention relates to wireless communication devices, and more specifically to a system and method of locating wireless devices.

Wireless communication devices include transceivers that allow the devices to communicate with a host system through the host system's transceiver. Such devices may include electronic price labels, personal identification cards, and wireless data collection devices, and other devices whose locations are desirable to know. Such devices may use RF or IR to communicate.

For example, electronic price labels (EPLs) are prone to being misplaced or moved from an assigned location to a different location in a store. It would be desirable to locate misplaced EPLs.

Another example of a wireless data collection device is one which includes a bar code reader and a wireless transceiver for communicating with a host computer. Such devices may be carried by customers. Therefore, it would be desirable to locate wireless data collection devices to track customer shopping patterns and to account for each customer-operated device in a store.

SUMMARY OF THE INVENTION

In accordance with the teachings of the present invention, a system and method of locating wireless devices is provided.

The system includes a number of transceivers each including a transmitter which transmits a first signal to the wireless device, a plurality of receivers including a plurality of sensors and at least one signal strength determining circuit for determining signal strengths of second signals received by the sensors, and a control circuit for controlling transmission of the first signal and reception of the second signals. A storage medium contains the locations for each of the sensors. A computer coupled to the control circuit instructs the control circuit to transmit the first signal and determines a location of the wireless device from the signal strengths and from the locations of the sensors.

A method of locating a wireless device transported through an area by a customer includes the steps of storing locations of a plurality of receiving sensors in the area, receiving signals from the wireless device as it is transported by the receiving sensors, determining signal strength measurements for the signals, and determining locations of the wireless device from the signal strength measurements.

It is accordingly an object of the present invention to provide a system and method of locating wireless devices.

It is another object of the present invention to provide a system and method of locating wireless data collection devices.

It is another object of the present invention to provide a system and method of locating wireless devices that determines the signal strength of a signal from a wireless device at each of a plurality of receiving antennas whose physical locations in an area are known.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 3 is a flow diagram illustrating the location method of the present invention.

DETAILED DESCRIPTION OF THE PREFERRED EMBODIMENT

Figure 1:
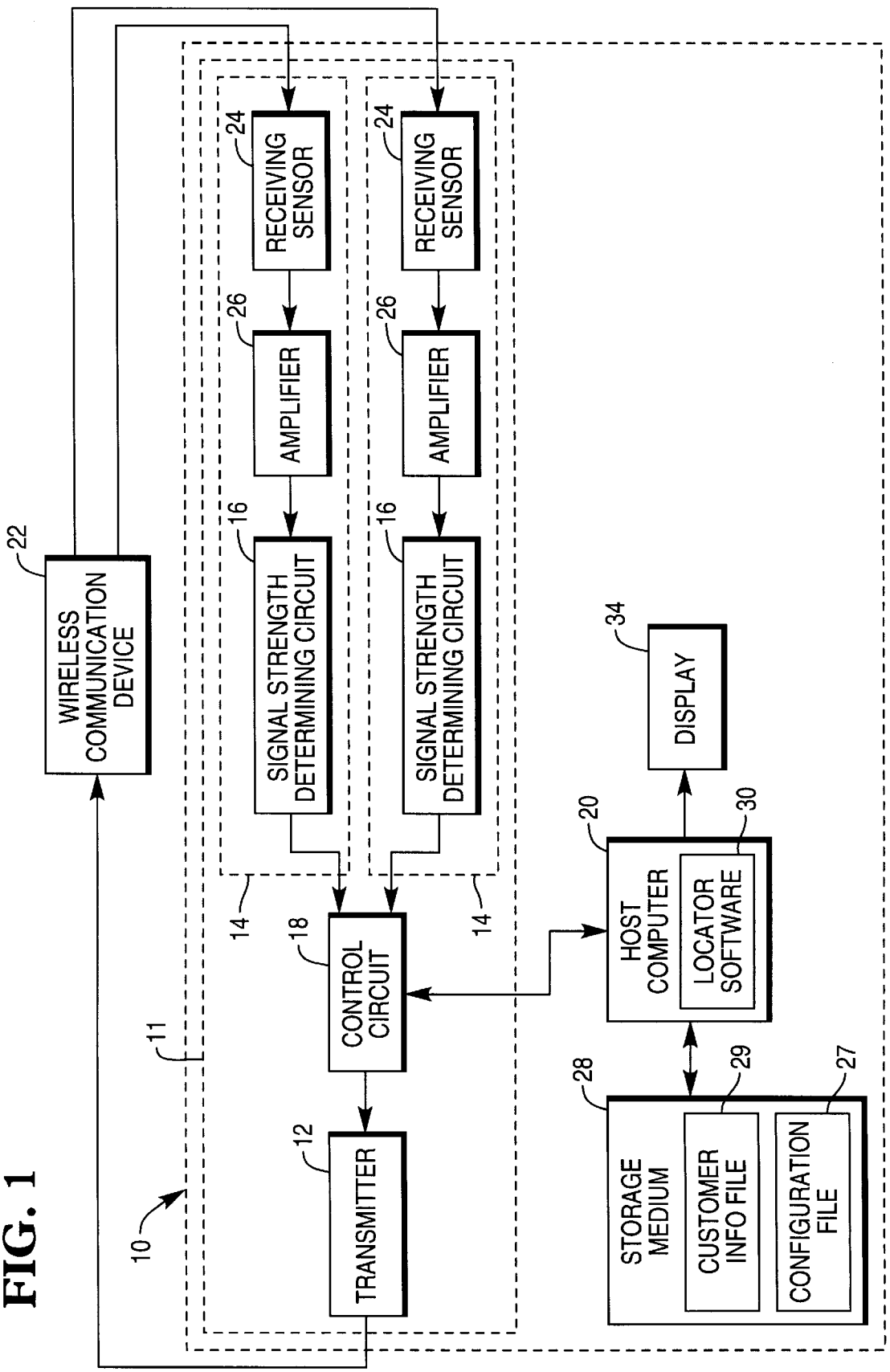
FIG. 1 is a block diagram of the system of the present invention.

Referring now to FIG. 1, system 10 includes transceiver 11 and host computer 20.

Transceiver 11 transmits and receives messages from wireless communication device 22. Transceiver 11 includes transmitter 12, receivers 14, and control circuit 18.

Transmitter 12 transmits messages to wireless communication device 22. If wireless communication device 22 is an EPL, transmitter 12 transmits price change and status messages addressed to one or more EPLs. If wireless communication device 22 is a wireless data collection terminal, transmitter 12 transmits price and article information when requested.

Receivers 14 receive messages from wireless communication device 22. If wireless communication device 22 is an EPL, receivers 14 receive acknowledgment messages or return data messages (some of the EPLs can talk back). If wireless communication device 22 is a wireless data collection terminal, transmitter 12 receives requests for price and article information.

Receivers 14 each include a signal strength determining circuit 16, a receiving sensor 24, and an amplifier 26.

Receiving sensors 24 may be an RF antenna or an IR sensor. Receiving sensors 24 are preferably located separately in an area, such as inside a transaction establishment or other building, and coupled to amplifiers 26 through a wire cable.

Amplifiers 26 amplify the received signal from receiving sensors 24. Amplifiers 26 amplify at the same gain.

Signal strength determining circuits 16 determine the signal strengths of messages arriving from receivers 14 and report the signal strengths to host computer 20 through control circuit 18.

Alternatively, a single signal strength determining circuit 16 may be employed, but this embodiment would require a switching module.

Control circuit 18 controls operation of transceiver 11, including routing of transmitted and received information to and from host computer 20.

Host computer 20 controls operation of system 10, which may include many transceivers 11 and many wireless communication devices 22. Additionally, host computer 20 executes locator software 30 which determines the location of wireless communication device 22 from signal strength information from each receiver and physical location information for each receiving sensor. Host computer 20 generates a fix which is displayed on display 34. Physical location information is stored within configuration file 27 in storage medium 28. Host computer 20 is preferably coupled to each transceiver 11 through a wire cable, but could be wireless to these devices.

Wireless communication device 22 is preferably a battery-powered device and may include an electronic price label, a personal identification card, and wireless data collection device, or any other portable transceiver that is capable of being relocated throughout an area.

Figure 2:
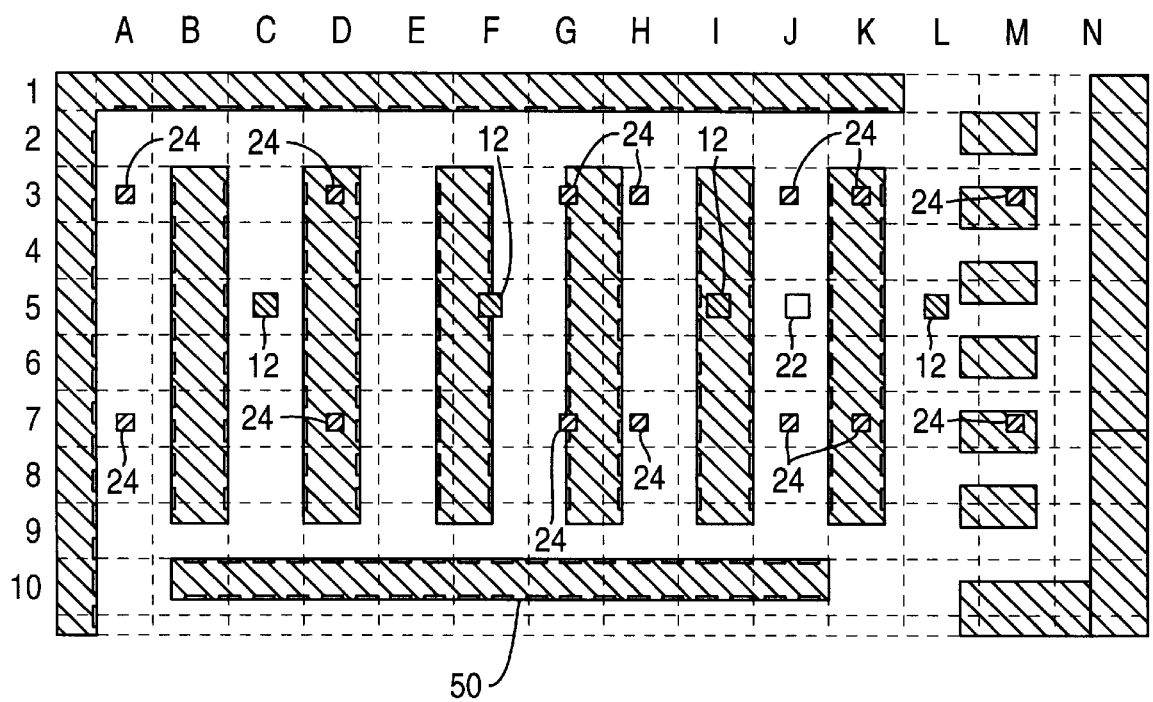
FIG. 2 is a map of a store.

Turning now to FIG. 2, a map of a typical transaction establishment is shown. Other types of areas or buildings are also envisioned by the present invention. The map illustrates the physical placement of shelves 50, transmitters 12, and receiving sensors 24. Receiving sensors 24 are located separately from each other and generally around transmitters 12. In addition, the location of wireless communication device 22 is also shown. The locations are referenced to a two-dimensional coordinate system in which rows are identified by numerals and columns are identified by letters.

The map is used by host computer 20 to determine the location of wireless communication device 22 in accordance with the method of the present invention.

In this example, the sought after device 22, is located at position 5J. Receiving sensors 24 are located at 3A, 7A, 3D, 7D, 3G, 7G, 3H, 7H, 3J, 7J, 3K, 7K, 3M, and 7M. Transmitters 12 are located at 5C, 5F, 5I, and 5L.

The store contents, including shelves 50, are assumed to be uniformly transparent to radiation. Also, device 22 is assumed to transmit at the same power level regardless of battery life until the battery fails. A maximum distance correlates with a predetermined minimum threshold strength.

A relative scale method could also be used. A 1–100 scale of closeness could be used. This scale could then be used to determine the location.

Where signal strength is assumed to decrease in a mathematically reproducible equation (e.g., exponential decrease), then fixing is more complicated due to the equations involved.

Turning now to FIG. 3, the method of operation of locator software 30 assumes that device 22 is a device that continuously or periodically transmits a signal, or can be made to generate a signal if it is still functioning normally. The operation is explained in more detail, beginning with START 60.

In step 62, the locations of receiving sensors 24 are determined and included in configuration file 27.

In step 64, locator software 30 receives signal strength measurements for all receiving sensors 24 from signal strength determining circuit 16.

In step 66, locator software 30 takes the three highest signal strength readings and performs a triangulation procedure to determine a fix for device 22. Locator software 30 generates a circle around the corresponding receiving sensors 24 having radii equal to the distances translated from the signal strength measurements. The area centered on the intersection of the three circles represents the fix.

In step 68, host computer 20 displays an indication of the fix to an operator using a display 34 or printer. If device 22 is assigned to a particular customer, tracking software stores an entry in customer information file 29 so that the customer's habits can be later gleaned from an inspection of the data in file 29.

In step 70, the method ends.

Although the present invention has been described with particular reference to certain preferred embodiments thereof, variations and modifications of the present invention can be effected within the spirit and scope of the following claims.

What is claimed is:

1. A system for locating a wireless device from among a plurality of wireless devices in a store, said plurality of wireless devices including electronic price labels, the system comprising:

a number of transceivers including
    a transmitter which transmits a first signal to the wireless device and which also transmits price information to electronic price labels;
    a plurality of receivers, each of said receivers including at least one sensor;
    at least one signal strength determining circuit for determining signal strengths of second signals received by the sensors; and
    a control circuit for controlling transmission of the first signal and reception of the second signals;
a storage medium containing locations for each of the sensors; and
a computer coupled to the control circuit which instructs the control circuit to transmit the first signal and which determines a location of the wireless device from the signal strengths and from the locations of the sensors.

2. The system as recited in claim 1, wherein the wireless device is assigned to a customer in a transaction establishment and wherein the computer determines a plurality of additional locations of the device as the customer moves through the transaction establishment and stores the location and the additional locations to form a record of shopping patterns of the customer.

3. The system as recited in claim 1, wherein each receiver includes a signal determining circuit.

4. A method of locating a wireless device transported through a predetermined area of a transaction establishment by a person from among a plurality of wireless devices in the transaction establishment, said plurality of wireless devices including electronic price labels, the method comprising the steps of:

storing locations of a plurality of receiving sensors located in the area;
receiving signals from the wireless device as the wireless device is transported by the receiving sensors;
determining signal strength measurements for the signals; and
determining locations of the wireless device from the signal strength measurements.

5. The system of claim 1 wherein at least two different types of devices are employed in the system.

6. The system of claim 5 wherein the at least two different types of devices comprise the electronic price labels and customer operated wireless data collection devices having a wireless transceiver for communicating with a host computer which are utilized by customers to receive price information for a product of interest from the host computer.

7. The system of claim 6 wherein the customer operated wireless data collection devices further comprise a bar code reader.

8. The system of claim 6 wherein said transmitters transmit price and status messages to a plurality of electronic price labels.

9. The system of claim 6 wherein said transmitters transmit price and article information to a plurality of customer operated wireless data collection devices.

10. The system of claim 8 wherein said transmitters transmit price and article information to a plurality of customer operated wireless data collection devices.

11. The system of claim 6 wherein said plurality of receivers receive acknowledgement or return data messages from electronic price labels.

12. The system of claim 6 wherein said plurality of receivers receive requests for price and article information from customer operated wireless data collection devices.

13. The system of claim 11 wherein said plurality of receivers receive requests for price and article information from customer operated wireless data collection devices.

14. The system of claim 2 wherein the computer executes customer tracking software to determine said plurality of additional locations and stores the record of shopping patterns in a customer information file stored in memory so that the customer's habits can be later gleaned from an inspection of the customer information file.

15. The system of claim 2 wherein the device location is displayed on a display as the customer moves with the wireless device through the transaction establishment.

16. The system of claim 1 wherein the three highest signal strengths received by three of the plurality of receivers and the stored locations of the sensors for those three receivers are employed by the computer which determines the location of the wireless device by triangulation.

17. The method of claim 4 further comprising the steps of:

receiving a customer request for price and article information; and transmitting the price and article information to the wireless device.

18. The method of claim 4 wherein the person is a customer and further comprising the step of:

storing customer tracking data in a customer information file stored in memory so that the customer's habits can be later gleaned from an inspection of the customer tracking data.

19. A method of operating and locating wireless data collection devices of at least two types, a first type comprising a plurality of electronic price labels and a second type comprising a plurality of customer operated wireless data collection devices, the method comprising the steps of:

storing locations of a plurality of receiving sensors located in a transaction establishment;

transmitting price and status messages to the electronic price labels;

transmitting price and article information to the customer operated wireless data collection devices in response to a request for price and article information;

receiving signals from the wireless devices as the wireless devices are transported through the transaction establishment;

determining signal strength measurements for said signals; and determining locations of the wireless devices from the signal strength measurements.

20. The method of claim 19 further comprising the step of:

storing an entry in a customer information file so that the customer's habits are stored in the customer information file.

\* \* \* \* \*